(12) United States Patent
Takamiya et al.

(10) Patent No.: US 7,720,591 B2
(45) Date of Patent: May 18, 2010

(54) INTAKE AIR CONTROL OF AN INTERNAL COMBUSTION ENGINE

(75) Inventors: Hideharu Takamiya, Saitama (JP); Isao Komoriya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 12/007,354

(22) Filed: Jan. 9, 2008

(65) Prior Publication Data

US 2008/0189026 A1 Aug. 7, 2008

(30) Foreign Application Priority Data

Jan. 16, 2007 (JP) .............................. 2007-006845
Sep. 12, 2007 (JP) .............................. 2007-236391

(51) Int. Cl.
G06F 19/00 (2006.01)
F02D 11/10 (2006.01)
F01L 1/34 (2006.01)

(52) U.S. Cl. ........................ 701/103; 701/110; 701/115; 123/90.15; 123/399

(58) Field of Classification Search .............. 123/90.11, 123/90.15–90.18, 361, 396, 399, 403; 701/101–103, 701/110, 115; 73/114.31, 114.32, 114.33, 73/114.36, 114.37; 702/182, 183, 185, 187
See application file for complete search history.

(56) References Cited

U.S. PATENT DOCUMENTS

| | | | |
|---|---|---|---|
| 5,088,462 A | 2/1992 | Hertweck et al. | |
| 5,666,918 A | 9/1997 | Pallett et al. | |
| 6,308,671 B1 | 10/2001 | Reed et al. | |
| 7,273,046 B2 * | 9/2007 | Osumi | 123/494 |
| 7,373,922 B2 * | 5/2008 | Muto et al. | 123/399 |

(Continued)

FOREIGN PATENT DOCUMENTS

JP 2000-161120 6/2000

(Continued)

OTHER PUBLICATIONS

European Search Report, 08000176.1-1263 dated Apr. 28, 2008.

*Primary Examiner*—Willis R Wolfe, Jr.
(74) *Attorney, Agent, or Firm*—Squire Sanders & Dempsey L.L.P.

(57) ABSTRACT

The present invention provides an intake air control capable of implementing a highly accurate constant negative pressure control with a smaller number of process steps under various environments. The intake air control is applicable to an engine having a variable valve actuation mechanism for adjusting at least a lift amount of an intake valve to control an intake air amount and a throttle valve for keeping a gauge pressure in an intake manifold at a desired gauge pressure. A reference throttle opening area is determined by referring to a first table based on a desired intake air amount. The first table defines a relation between an intake air amount and a throttle opening area under a reference gauge pressure, a reference atmospheric pressure and a reference intake air temperature. A throttle opening area for achieving the desired gauge pressure is determined by correcting the reference throttle opening area with a correction parameter derived based on the Bernoulli's law by using the desired gauge pressure, a current atmospheric pressure and a current intake air temperature.

33 Claims, 11 Drawing Sheets

U.S. PATENT DOCUMENTS

| | | | |
|---|---|---|---|
| 7,631,550 B2 * | 12/2009 | Mukai | 73/114.33 |
| 2002/0179052 A1 | 12/2002 | Ganser et al. | |
| 2008/0275623 A1 * | 11/2008 | Osumi et al. | 701/103 |

FOREIGN PATENT DOCUMENTS

| | | |
|---|---|---|
| JP | 2000-227033 | 8/2000 |
| JP | 2004-036560 | 2/2004 |
| WO | WO 0019078 | 4/2000 |

* cited by examiner

US 7,720,591 B2

INTAKE AIR CONTROL OF AN INTERNAL COMBUSTION ENGINE

BACKGROUND OF THE INVENTION

The present invention relates to an intake air control of an internal combustion engine (which will be hereinafter referred to as an "engine").

Conventionally, a constant negative pressure control for keeping a negative pressure (gauge pressure) in the intake manifold of an engine constant at a desired value by adjusting an opening degree of a throttle valve has been proposed. For example, such a control is disclosed in Japanese Patent Application Publication No. 2000-161120.

According to a conventional scheme for the constant negative pressure control, a table used for determining an opening degree of the throttle valve that implements a desired value of the negative pressure is prepared. When a plurality of desired values of the negative pressure are pre-established, such a table is required for each of the plurality of desired values. One of the tables that corresponds to a current desired value is selected and then an environmental correction process based on the result of a pretest is performed to determine a final value of the opening degree of the throttle valve. Further, when air flows into an intake air system via a route other than the throttle valve (such air is called secondary air), the throttle opening degree is further corrected, for example, by a feedback control of the negative pressure.

According to the conventional scheme for the constant negative pressure control, many process steps are required for determining an opening degree of the throttle valve. A table for determining an opening degree of the throttle valve is required for each of the pre-established desired values of the negative pressure. Thus, a process by one or more software programs for implementing the constant negative pressure control may be complex. Further, depending on the amount of the secondary air, it may be difficult for the feedback control to correct the opening degree of the throttle valve.

Considering the above problems, the present invention aims at providing an intake air control scheme that implements a constant negative pressure control with a smaller number of process steps and with a higher accuracy under various environments.

SUMMARY OF THE INVENTION

According to one aspect of the invention, an intake air control of an engine is provided. The engine has a variable valve actuation mechanism for adjusting at least a lift amount of an intake valve to control an intake air amount and a throttle valve for keeping a gauge pressure in an intake manifold at a predetermined desired gauge pressure. According to the intake air control, a reference throttle opening area (Abase) is determined by referring to a first table based on a desired intake air amount. The first table defines a relation between an intake air amount and a throttle opening area under a reference gauge pressure (PBGAbase), a reference atmospheric pressure (Pbase) and a reference intake air temperature (Tbase). The reference throttle opening area is corrected with a correction parameter to determine a throttle opening area (A) for achieving the desired gauge pressure. Here, the correction parameter is derived based on the Bernoulli's law using the desired gauge pressure, a current atmospheric pressure and a current intake air temperature.

Thus, the throttle opening area can be determined by using only one table and only one correction parameter under various operating conditions where the desired gauge pressure, the intake air temperature and the atmospheric pressure may variously change. The constant negative pressure control is implemented with a higher accuracy and with a smaller number of process steps.

According to one embodiment of the invention, an effective intake air amount is determined through a filtering process that minimizes an error between the desired intake air amount and an actual intake air amount. The actual intake air amount may be detected by an intake air amount detecting means. The reference throttle opening area is determined by referring to the first table based on the effective intake air amount. Thus, a more appropriate reference throttle opening area is determined based on the effective intake air amount in which an error between the desired intake air amount and the actual intake air amount, which is caused by, for example, a secondary air, has been eliminated.

According to another embodiment of the invention, an opening degree of the throttle valve is determined by referring to a second table based on the throttle opening area thus determined. The second table defines a relation between the throttle opening area and the opening degree of the throttle valve. Thus, the opening degree of the throttle valve is controlled in accordance with the throttle opening area.

According to one embodiment of the invention, the throttle opening area is feedback corrected by adding a correction amount ($\Delta A$) to the above determined throttle opening area. Here, the correction amount is determined such that the gauge pressure in the intake manifold converges to a desired gauge pressure. Thus, the actual gauge pressure is kept at a desired gauge pressure with a higher accuracy by using the feedback control.

According to one embodiment of the invention, the feedback correction includes changing a feedback gain used for determining the correction amount when an engine load is low or high, when a fuel cut is being performed, when the desired gauge pressure is low, or when a variation in the desired gauge pressure is large. Thus, the convergence characteristics of the feedback control can be changed in accordance with the operating condition of the engine.

According to one embodiment of the invention, the feedback correction is stopped by setting the correction amount to zero when the throttle is fully opened, when the engine starts, or when the engine operates with a fixed lift amount of the intake valve. Thus, the feedback control is stopped in accordance with the operating condition of the engine.

According to one embodiment of the invention, the throttle opening area (A) is corrected based on a parameter indicating a viscosity of the intake air of the engine and an opening area ratio (m) of the throttle opening area relative to an opening area ($A_D$) of the intake manifold.

Depending on the viscosity of the intake air and the opening area ratio, the amount of the intake air flowing through the throttle valve may vary. According to the invention, even when such variation occurs, a throttle opening area that can achieve the desired gauge pressure is determined because the throttle opening area is corrected based on the viscosity of the intake air and the opening area ratio.

According to one embodiment of the invention, the parameter indicating the viscosity is a Reynolds number (Re). The Reynolds number is determined based on the effective intake air amount (Qe), the opening area ($A_D$) of the intake manifold, an inner diameter (D) of the intake manifold, and a viscosity coefficient ($\mu$) of the intake air. In one embodiment, the viscosity coefficient is determined based on the current intake air temperature. Thus, the parameter indicating the viscosity of the intake air is determined.

According to another embodiment of the invention, the feedback correction includes determining the correction amount (ΔA) for the corrected throttle opening area (A2) and then adding the correction amount to the corrected throttle opening area. Thus, a more appropriate correction amount is determined by using the corrected throttle opening area in the feedback control.

According to one embodiment of the invention, when a difference between the gauge pressure (PBGA) in the intake manifold and the desired gauge pressure (PBGA_CMD) is greater than a predetermined value, the feedback correction is prohibited to control the opening degree of the throttle valve to a predetermined value.

DESCRIPTION OF THE PREFERRED EMBODIMENTS

Figure 1:
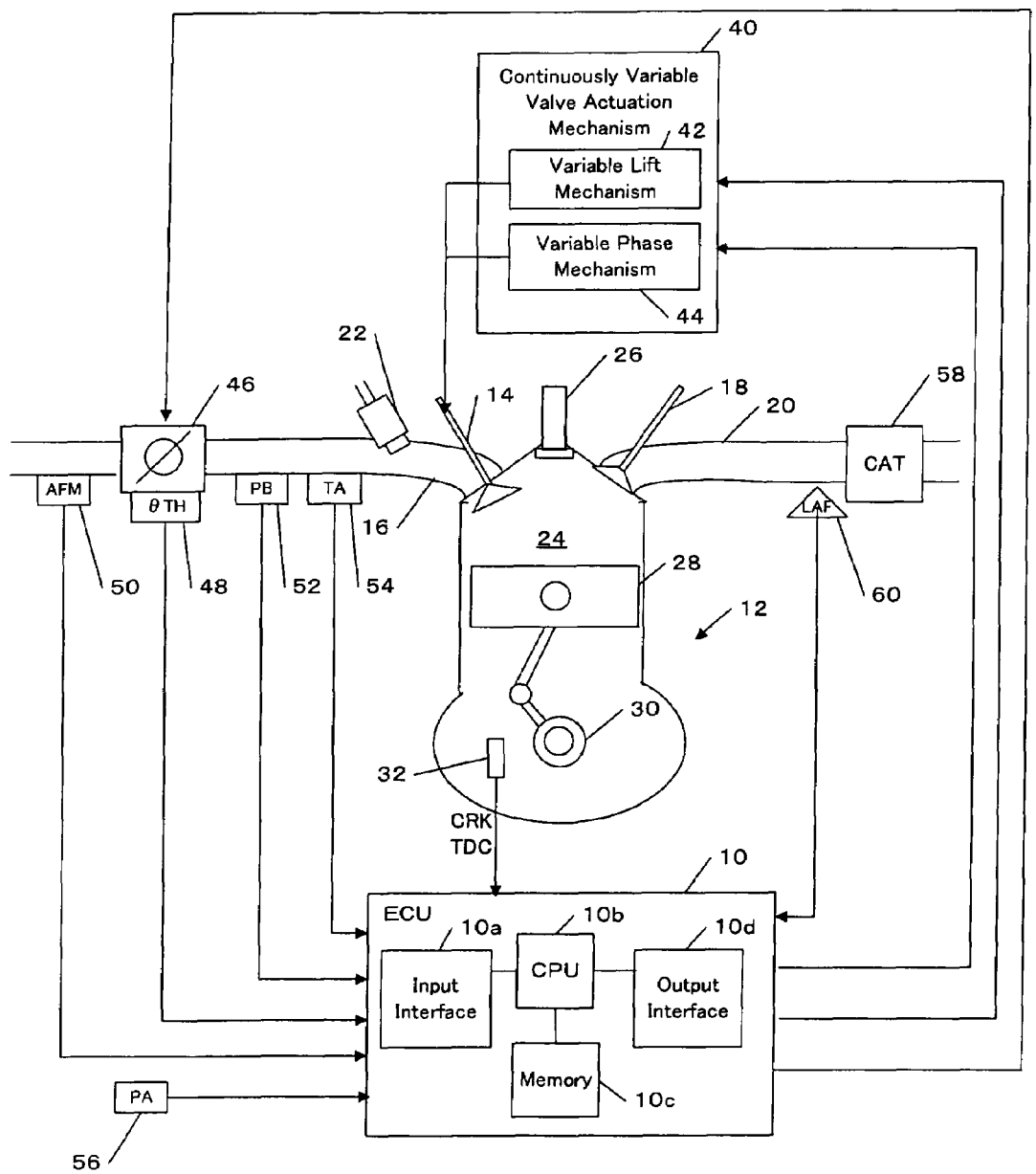
FIG. 1 is a block diagram of an overall system structure of an engine and its control unit in accordance with one embodiment of the present invention.

Preferred embodiments of the present invention will be described referring to the attached drawings. FIG. 1 is an overall system structure of an engine and its control unit in accordance with one embodiment of the present invention.

An electronic control unit (hereinafter referred to as an "ECU") 10 is a computer having an input interface 10a for receiving data sent from each part of a vehicle, a CPU 10b for carrying out operations for controlling each part of the vehicle, a memory 10c including a read only memory (ROM) and a random access memory (RAM) that temporarily stores data, and an output interface 10d for sending a control signal to each part of the vehicle. Various programs and data for controlling each part of the vehicle are stored in the ROM.

One or more programs for implementing a constant negative pressure control, and data and one or more tables used in performing the programs according to one embodiment of the invention are stored in the ROM. The ROM may be a rewritable ROM such as an EEPROM. The RAM provides work areas for operations by the CPU 10b, in which data sent from each part of the vehicle as well as a control signal to be sent out to each part of the vehicle are temporarily stored.

Signals sent to the ECU 10 are passed to the input interface 10a. The input interface 10a converts analog signal values into digital signal values. The CPU 10b processes the resulting digital signals, performs operations in accordance with one or more programs stored in the memory 10c, and creates control signals. The output interface 10d sends these control signals to each part of the vehicle.

An engine 12 is, for example, a 4-cycle engine equipped with four cylinders. One of the cylinders is schematically illustrated in FIG. 1. The engine 12 is connected to an intake manifold 16 through an intake valve 14 and connected to an exhaust manifold 20 through an exhaust valve 18. A fuel injection valve 22 for injecting fuel in accordance with a control signal from the ECU 10 is provided in the intake manifold 16. Alternatively, the fuel injection valve 22 may be provided in a combustion chamber 24.

The engine 12 introduces an air-fuel mixture of the air taken from the intake manifold 16 and the fuel injected from the fuel injection valve 22 into the combustion chamber 24. A spark plug 26 is provided in the combustion chamber 24 to ignite the spark in accordance with an ignition timing signal from the ECU 10. The air-fuel mixture combusts in response to the spark ignited by the spark plug 26. The combustion increases the volume of the air-fuel mixture. A piston 28 is pushed downward. A reciprocal motion of the piston 28 is converted into a rotational motion of a crank shaft 30. In the case of a 4-cycle engine, a cycle of the engine includes four strokes of intake, compression, combustion and exhaust. The piston 28 travels up and down four times in one cycle.

A crank angle sensor 32 for detecting a rotation angle of the crank shaft 30 is provided in the engine 12. The crank angle sensor 32 outputs a CRK signal and a TDC signal, which are pulse signals, to the ECU 10 in accordance with the rotation of the crankshaft 30.

The CRK signal is a pulse signal that is output at a predetermined crank angle (e.g., at every 30 degrees). The TDC signal is a pulse signal that is output at a crank angle (e.g., at every 180 degrees) associated with a TDC (top dead center) position of the piston 28. These pulse signals are used in various timing controls such as fuel injection timing, ignition timing or the like for operating the engine.

A continuously variable valve actuation mechanism 40 is a mechanism capable of continuously changing a lift amount and an opening/closing timing (phase) of the intake valve 14. In this embodiment, the continuously variable valve actuation mechanism 40 includes a variable lift mechanism 42 and a variable phase mechanism 44.

The variable lift mechanism 42 is a mechanism capable of continuously changing the lift amount of the intake valve 14 in accordance with a control signal from the ECU 10. The variable lift mechanism can be implemented by any known technique. For example, a mechanism implemented with a cam, lift variable link, upper link, and lower link has been proposed in Japanese Patent Application Publication No.

2004-036560. In the mechanism, the angle of the lower link is changed by, for example, an actuator to control a maximum lift amount of the valve.

The variable phase mechanism 44 is a mechanism capable of continuously changing the opening/closing timing (phase) of the intake valve 14 in accordance with a control signal from the ECU 10. The variable phase mechanism can be implemented by any known technique. For example, a mechanism for electromagnetically advancing and retarding the phase of the intake valve has been proposed in Japanese Patent Application Publication No. 2000-227033.

Alternatively, the variable lift mechanism 42 and the variable phase mechanism 44 may be integrated into a single unit. The present invention is not limited to these mechanisms that are capable of continuously changing the lift amount and the phase. The present invention is applicable to a mechanism capable of changing the lift amount and the phase in a step-by-step manner.

In this embodiment, the continuously variable valve actuation mechanism 40 is utilized for controlling the amount of intake air introduced into the engine 12. The intake air amount can be controlled by changing the lift amount of the intake valve 14 via the continuously variable valve actuation mechanism 40.

A throttle valve 46 is provided in the intake manifold 16. The throttle valve 46 is a drive-by-wire (DBW) throttle valve that is driven by an actuator (not illustrated in the drawings) in accordance with a control signal from the ECU 10.

A throttle valve opening sensor 48, which is attached to the throttle valve 46, provides the ECU 10 with a signal corresponding to an opening degree TH of the throttle valve.

In this embodiment, the throttle valve 46 is used in a constant negative pressure control for keeping a negative pressure inside the intake manifold constant at a desired value. The constant negative pressure control can be implemented by changing the opening degree of the throttle valve 46 to adjust a gauge pressure inside the intake manifold.

An air flow meter 50 is provided upstream of the throttle valve 46 of the intake manifold 16. The air flow meter 50 outputs to the ECU 10 an electric signal indicating the amount of intake air GAIR.

An intake manifold pressure sensor 52 and an intake air temperature sensor 54 are provided downstream of the throttle valve 46 of the intake manifold 16 to output to the ECU 10 electric signals indicating an absolute pressure PB inside the intake manifold and a temperature TA of intake air, respectively.

An atmospheric pressure sensor 56 is provided at an appropriate position outside the engine to output to the ECU 10 an electric signal indicating an atmospheric pressure PA.

A LAF (linear air-fuel) sensor 60 is provided upstream of a catalyst 58 of the exhaust manifold 20. The LAF sensor 60 outputs to the ECU 10 a signal that is proportional to the concentration of oxygen included in the exhaust gas over a wide range from lean to rich.

Figure 2:
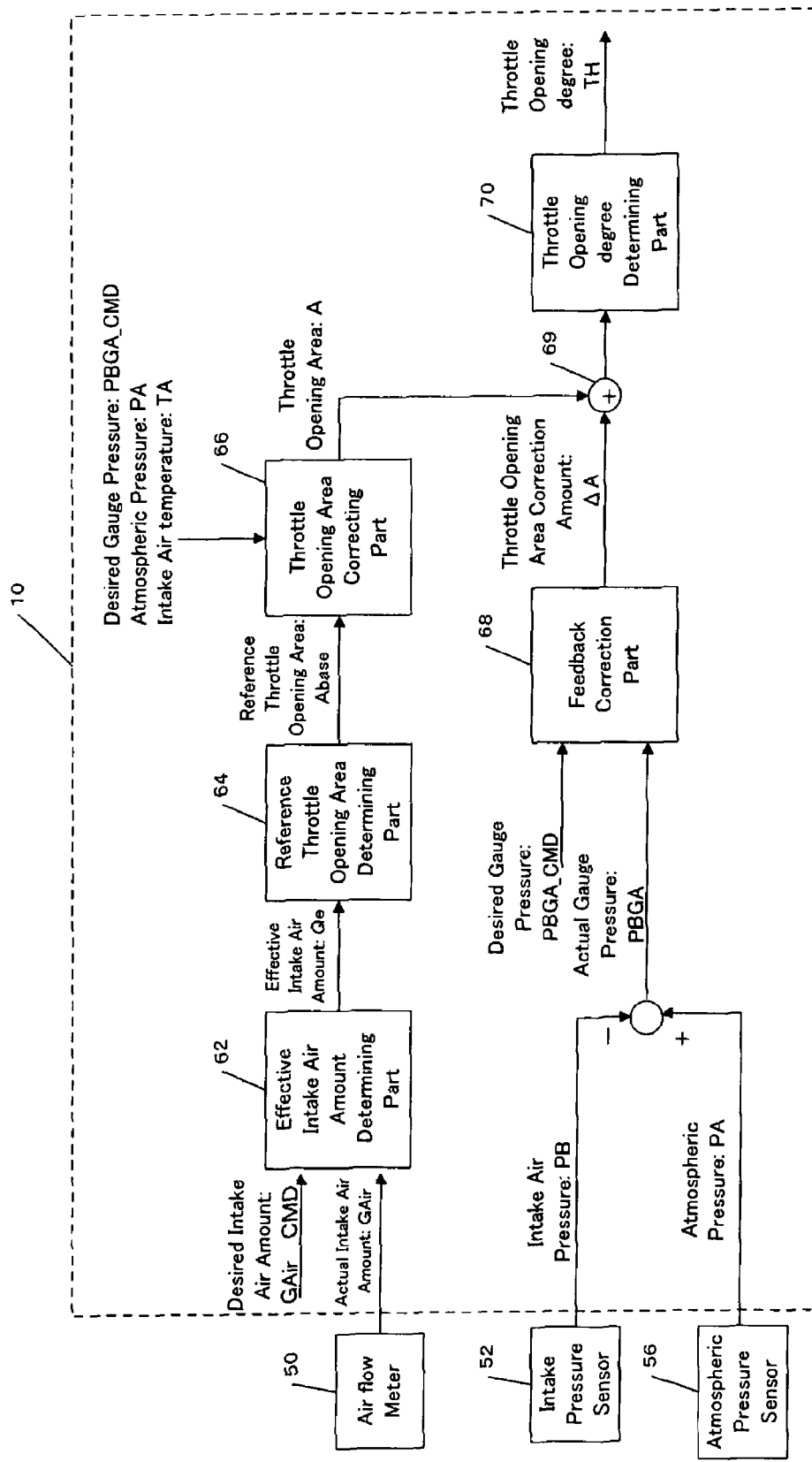
FIG. 2 shows a functional block diagram of a control unit of an intake air controlling apparatus for a constant negative pressure control in accordance with a first embodiment of the present invention.

Referring to FIG. 2, an intake air controlling apparatus of the engine in accordance with a first embodiment of the present invention will be described.

As described above, the intake air controlling apparatus controls the amount of the intake air by adjusting the lift amount of the intake valve 14 via the variable valve actuation mechanism 40. The intake air controlling apparatus also performs the constant negative pressure control for keeping the gauge pressure in the intake manifold 16 at a desired gauge pressure independently of an increase/decrease of the intake air amount. In one embodiment, each function of the intake air controlling apparatus is implemented in the ECU 10. The CPU 10b of the ECU 10 performs one or more programs stored in the memory 10c of the ECU 10 to implement the functions.

FIG. 2 shows a detail of functions for the constant negative pressure control in the intake air controlling apparatus. In brief, the constant negative pressure control is formed by two sections. One section includes an effective intake air amount determining part 62, a reference throttle opening area determining part 64 and a throttle opening area correcting part 66 and acts to perform a feed-forward control for estimating, based on a desired intake air amount, an opening area of the throttle valve 46 for achieving a desired gauge pressure under the current atmospheric pressure and the current intake air temperature. The other section includes a feedback correction part 68 and acts to perform a feedback control for determining a correction amount of the throttle opening area such that the current gauge pressure inside the intake manifold is kept at the desired gauge pressure.

At first, the section acting to perform the feed-forward control, which is illustrated in the upper portion of FIG. 2, will be described. Preferably, the effective intake air amount determining part 62 is provided to determine an effective intake air amount Qe by using a known recursive identification algorithm. The effective intake air amount Qe indicates an amount of intake air that actually passes through the throttle valve 46 relative to the desired intake air amount GAIR_CMD.

The effective intake air amount Qe is modeled as expressed in the equation (1). The desired intake air amount GAIR_CMD is determined in accordance with the operating condition of the engine (for example, the opening degree of the accelerator pedal and/or the engine rotational speed) by using any known appropriate technique. θ indicates a model parameter. The intake air amount that actually passes through the throttle valve has an error to the desired intake air amount due to the influence by the secondary air or the like. The error is represented by the model parameter.

$$Qe(\text{current value}) = \theta(\text{current value}) + GAIR\_CMD(\text{current value}) \tag{1}$$

In order to determine the model parameter θ, the recursive identification algorithm (a least square filter in this embodiment) as expressed in the equation (2) is applied to the identification error e. As expressed in the equation (3), the identification error e is a difference between an actual intake air amount GAIR that is measured by the air flow meter 50 and the effective intake air amount Qe based on the model. P indicates an identification gain, which is, for example, 0.01. Thus, the model parameter θ is calculated such that the identification error e is minimized.

$$\theta(\text{current value}) = \theta(\text{previous value}) + P \cdot e(\text{current value}) \tag{2}$$

$$e(\text{current value}) = GAIR(\text{current value}) - (\theta(\text{previous value}) + GAIR\_CMD(\text{current value})) \tag{3}$$

The effective intake air amount Qe thus calculated has advantages of both of controlling the throttle opening degree based on the actual intake air GAIR and controlling the throttle opening degree based on the desired intake air GAIR_CMD. Because the actual intake air amount GAIR is detected by the air flow meter 50 provided upstream of the throttle 46, the throttle opening degree can be accurately estimated without being influenced by the secondary air. However, there is a disadvantage that the estimated opening degree may be unstable because the value of the actual intake air amount GAIR varies in accordance with variations of the throttle valve.

On the other hand, the desired intake air amount GAIR_CMD is not influenced by variations of the throttle valve because the actual throttle opening degree is not used as a parameter for determining the desired intake air amount. However, there is a disadvantage that the estimation accuracy of the throttle opening degree may be degraded because the accurate amount of air flowing through the throttle valve is unknown when the secondary air is introduced.

By controlling the throttle opening degree based on the effective intake air amount Qe, both of the advantage that the accuracy of the throttle control is maintained when the secondary air is introduced and the advantage that the interference with the throttle valve is prevented can be simultaneously achieved.

The reference throttle opening area determining part 64 refers to a correlation table based on the effective intake air amount Qe to determine a reference throttle opening area Abase. The table defines a relation between the throttle opening area and the intake air amount under a predetermined reference condition of a reference gauge pressure, a reference atmospheric pressure and a reference intake air temperature. The reference throttle opening area Abase indicates a throttle opening area under the reference condition.

Figure 3:
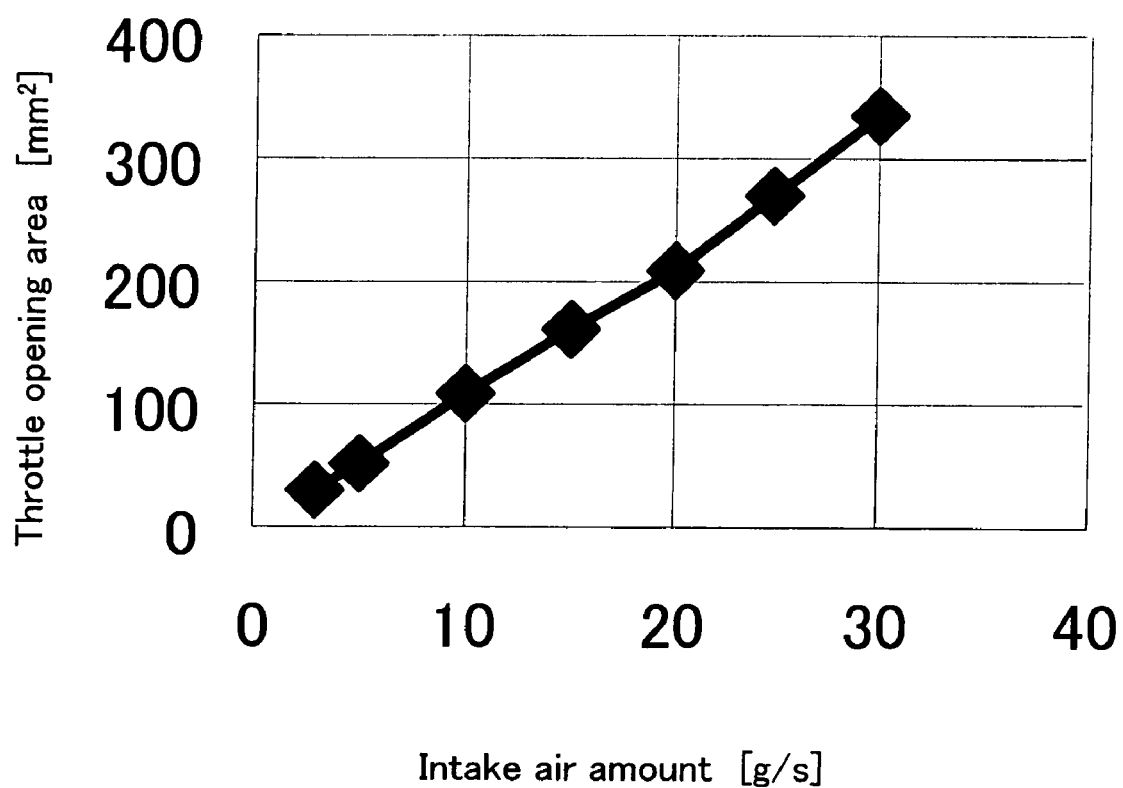
FIG. 3 is a correlation table defining a relation between an effective intake air amount and a throttle opening area under a reference condition in accordance with one embodiment of the present invention.

FIG. 3 shows an example of the correlation table. This example shows a relation between the throttle opening area and the effective intake air amount under the reference condition where the gauge pressure is 50 mmhg (6.666 kPa), the atmospheric pressure is 1 atmosphere (that is, 760 mmHg or 101.32 kPa) and the intake air temperature is 25 degrees (° C.). The gauge pressure indicates a difference pressure of the intake manifold absolute pressure relative to the atmospheric pressure. This correlation table may be stored in the memory 10c of the ECU 10 (FIG. 1).

The reference throttle opening area Abase thus determined indicates a throttle opening area required for achieving the effective intake air amount under the above reference condition. It should be noted that the reference condition is not limited to the above values. The reference condition may be established by the gauge pressure, the atmospheric pressure and the intake air temperature having values other than the above described values.

Alternatively, the reference throttle opening area Abase may be determined by referring to the table as shown in FIG. 3 based on the desired intake air amount. In this alternative embodiment, the effective intake air amount determining part 62 is not required.

A throttle opening area correcting part 66 corrects the reference throttle opening area Abase based on the desired gauge pressure PBGA_CMD, the current intake air temperature TA, and the current atmospheric pressure PA to determine a throttle opening area A adaptive to the current operating condition of the engine. The desired gauge pressure may be determined in accordance with the engine operating condition by using any known technique (for example, it can be determined in accordance with the desired lift amount of the intake valve such that the desired intake air amount is achieved). The current intake air temperature TA is detected by the intake air temperature sensor 54 (FIG. 1). The current atmospheric pressure PA is detected by the atmospheric pressure sensor 56 (FIG. 1).

This correction process is performed by using a correction equation that is derived from the Bernoulli's law as follows:

$$A = A_{base} \times \sqrt{\frac{PBGA_{base}}{|PBGA\_CMD|} \times \frac{273 + TA}{273 + Tbase} \times \frac{P_{base}}{PA}} \quad (4)$$

PBGAbase indicates the reference desired gauge pressure under the above reference condition. Tbase indicates the reference intake air temperature under the reference condition. Pbase indicates the reference atmospheric pressure under the reference condition. As described above, these are 50 mmHg (6.666 kPa), 25 degrees (° C.) and 760 mmHg (101.32 kPa), respectively, in this embodiment. It should be noted that 273 is added to TA and Tbase in the equation (4) because the temperature is represented in kelvins (K).

Figure 4:
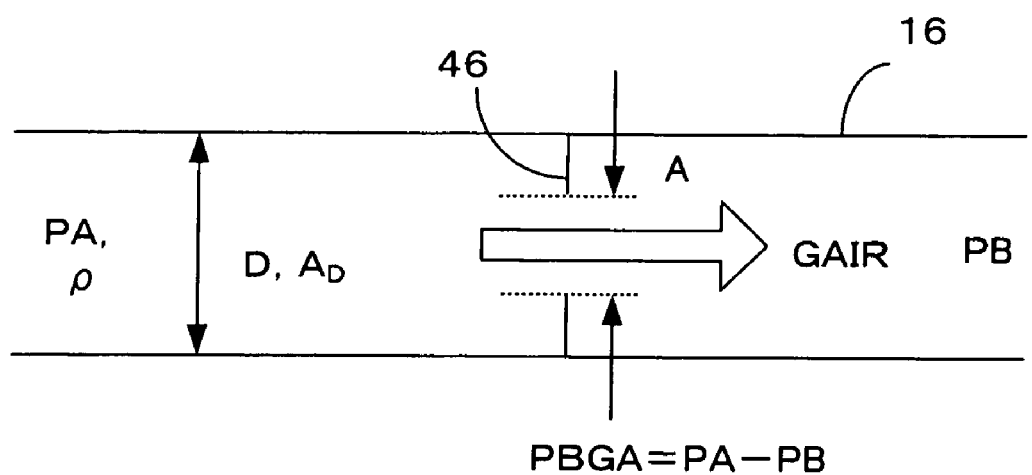
FIG. 4 schematically shows various parameters regarding an intake manifold in accordance with one embodiment of the present invention.

Referring to FIG. 4, it will be described how to derive the equation (4). Various parameters regarding the intake manifold 16 in which the throttle valve 46 is provided are shown in the figure. An opening area and a bore diameter (inner diameter) of the flow path in the intake manifold, which are represented by $A_D$ and D, respectively, are predetermined. An opening area at a position where the throttle valve 46 is provided, that is, a throttle opening area, is represented by "A". A pressure in the upstream of the throttle valve 46 is represented by the atmospheric pressure PA. A pressure in the downstream of the throttle valve 46, which is detected by the intake manifold pressure sensor 52 (FIG. 1), is represented by PB. A gauge pressure PBGA is calculated by (PA−PB). An air density is represented by ρ. The figure shows a state where the intake air having a flow amount of GAIR is passing through the throttle valve.

In general, when air having a flow amount GAIR flows from a region of a pressure PA (the atmospheric pressure in this example) into a region of a pressure PB through a path having a cross sectional area A, the cross sectional area A of the path is expressed in accordance with the Bernoulli's law, as shown by the equation (5).

$$A = \frac{GAIR}{C} \times \frac{1}{\sqrt{2\rho \cdot PBGA}} \quad (5)$$

C is a flow coefficient (which is also called "discharge coefficient"), which has a predetermined value in the first embodiment.

Similarly, when an air having a flow amount GAIR flows through a path having a cross sectional area Abase under the reference condition of the reference desired gauge pressure PBGAbase, the reference intake air temperature Tbase and the reference atmospheric pressure Pbase, the cross sectional area Abase of the path is expressed as shown by the equation (6). ρ' in the equation (6) indicates an air density under this condition.

$$A_{base} = \frac{GAIR}{C} \times \frac{1}{\sqrt{2\rho' \cdot PBGAbase}} \quad (6)$$

According to the equation (6), the flow coefficient C is expressed as in the equation (7).

$$C = \frac{GAIR}{A_{base}} \times \frac{1}{\sqrt{2\rho' \cdot PBGAbase}} \qquad (7)$$

By substituting the equation (7) into the equation (5), the following equation is obtained.

$$A = \frac{GAIR}{\frac{GAIR}{A_{base}} \times \frac{1}{\sqrt{2\rho' \cdot PBGAbase}}} \times \frac{1}{\sqrt{2\rho \cdot PBGA}} \qquad (8)$$

$$= A_{base} \times \sqrt{2\rho' \cdot PBGAbase} \times \frac{1}{\sqrt{2\rho \cdot PBGA}}$$

$$= A_{base} \times \sqrt{\frac{PBGAbase}{PBGA} \times \frac{\rho'}{\rho}}$$

$\rho'/\rho$ is a ratio of the air density, which is expressed as in the equation (9) based on the well-known gas equation of (PV=nRT).

$$\frac{\rho'}{\rho} = \frac{273 + TA}{273 + Tbase} \times \frac{Pbase}{PA} \qquad (9)$$

By substituting the equation (9) into the equation (8), the equation (4) for determining a throttle opening area A for any desired gauge pressure PBGA_CMD, intake air temperature TA and atmospheric pressure PA is derived.

Thus, the throttle opening area A corrected by the equation (4) indicates a throttle opening area for achieving the desired gauge pressure PBGA_CMD under the current atmospheric pressure PA and intake air temperature TA.

Figure 5:
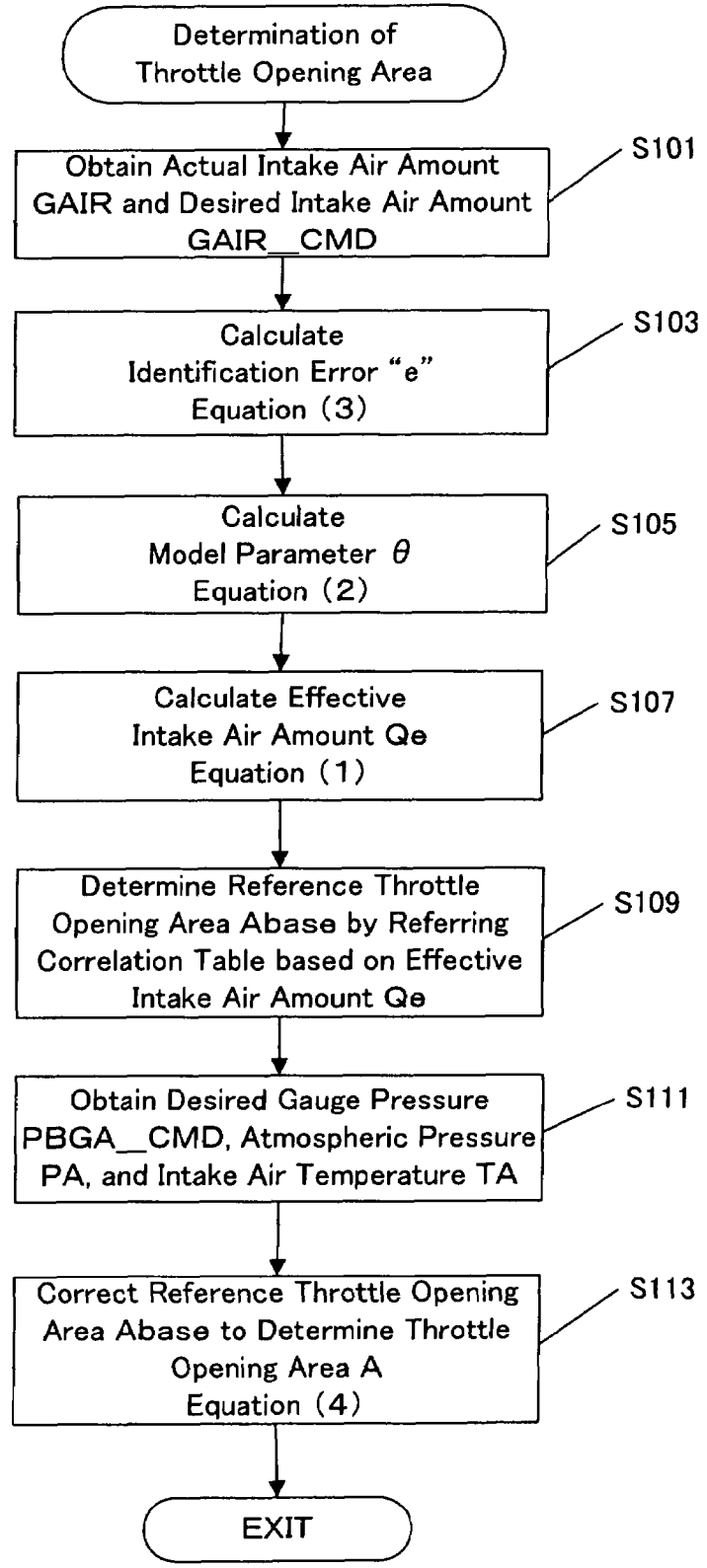
FIG. 5 is a flowchart of a process for determining a throttle opening area in accordance with a first embodiment of the present invention.

FIG. 5 is a flowchart of a process for determining the throttle opening area A in accordance with the first embodiment of the present invention. In one embodiment, the process is carried out by the CPU of the ECU 10, and more specifically carried out by the effective intake air amount determining part 62, the reference throttle opening area determining part 64 and the throttle opening area correcting part 66 shown in FIG. 2. The process may be performed in a predetermined time interval.

In step S101, the desired intake air amount GAIR_CMD and the actual intake air amount GAIR are obtained. As described above, the desired intake air amount GAIR_CMD may be determined in accordance with the engine operating condition, and the actual intake air amount GAIR may be obtained from the detection value of the air flow meter 50.

In step S103, the identification error e is calculated by using the above described equation (3). In step S105, the current value of the model parameter θ is calculated by using the above described equation (2). In step S107, the effective intake air amount Qe is calculated by using the above described equation (1).

In step S109, a correlation table as shown in FIG. 3 is referred to based on the effective intake air amount Qe to determine the reference throttle opening area Abase. In step S111, the desired gauge pressure PBGA_CMD, the atmospheric pressure PA and the intake air temperature TA are obtained. As described above, the desired gauge pressure may be determined in accordance with the engine operating condition. The atmospheric pressure PA and the intake air temperature TA may be obtained from the detection values of the atmospheric pressure sensor 56 and the intake air temperature sensor 54, respectively.

In step S113, the reference throttle opening area Abase is corrected by using the above described equation (4) to calculate the throttle opening area A used for implementing the desired gauge pressure PBGA_CMD.

Referring back to FIG. 2, the section acting to perform the feedback control will be described. The feedback correction part 68 determines a correction amount ΔA for the throttle opening area based on the gauge pressure PBGA inside the intake manifold and the desired gauge pressure PBGA_CMD.

As described above, the throttle opening area A is determined such that it indicates a throttle opening area required for achieving the desired gauge pressure PBGA_CMD under the condition of the current effective intake air amount Qe, the current atmospheric pressure PA, the intake air temperature TA and so on. However, the correlation table and the correction equation used in this determination are established without considering influence of carbon or the like which may be accumulated in the throttle valve over time. When the accumulation of the carbon increases, the actual throttle opening area may be smaller than the calculated throttle opening area even if the throttle valve is controlled to an opening degree determined in accordance with the calculated throttle opening area. As a result, an error may occur between the actual gauge pressure and the desired gauge pressure.

In order to prevent this, considering the influence of disturbance such as the accumulated carbon amount or the like, the feedback control is preferably performed such that the actual gauge pressure PBGA converges to the desired gauge pressure PBGA_CMD.

Figure 6:
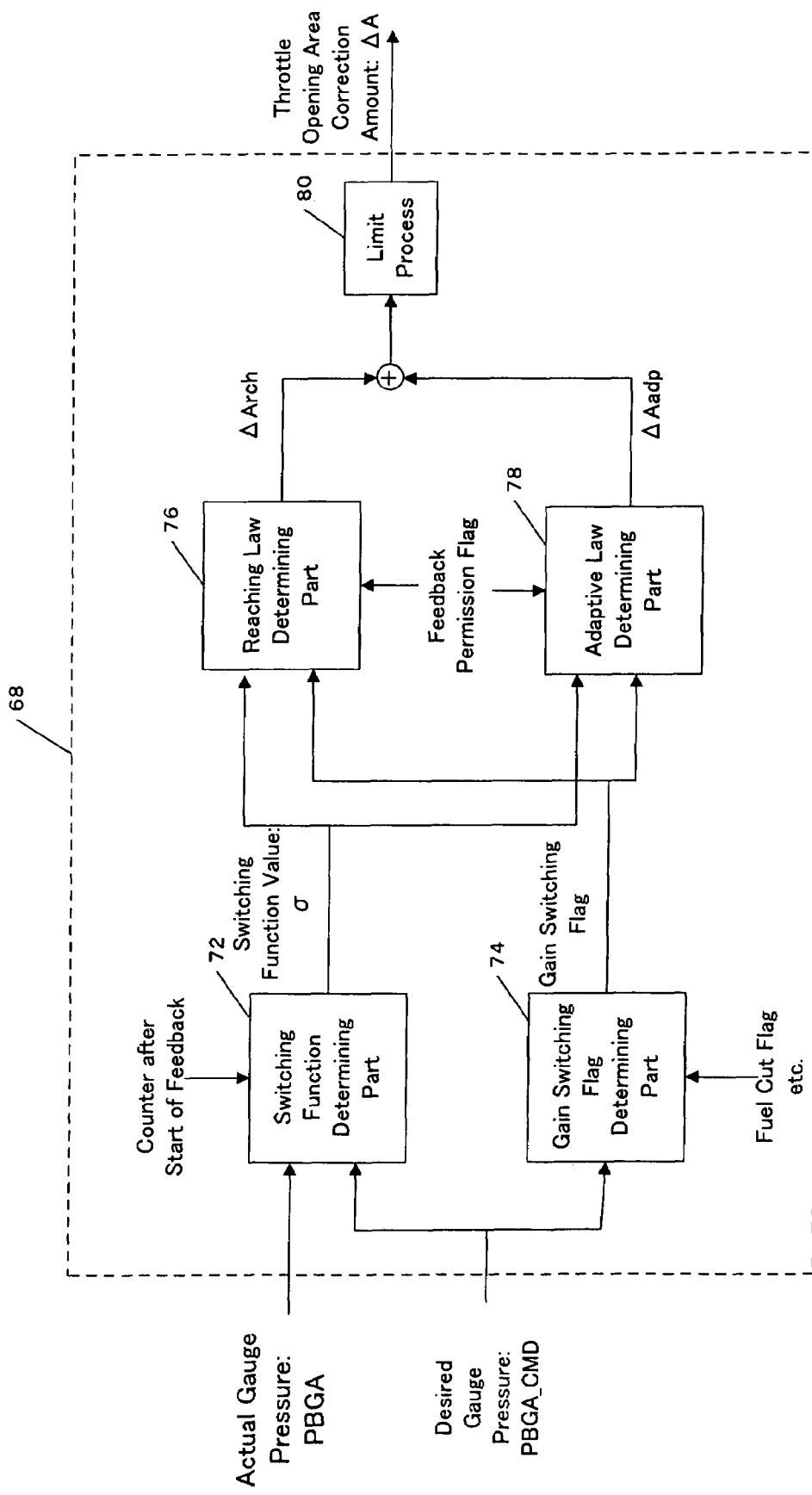
FIG. 6 is a functional block diagram of a feedback correction part in accordance with one embodiment of the present invention.

FIG. 6 shows functional blocks of the feedback correction part 68 in accordance with one embodiment of the invention. The feedback correction part 68 of this embodiment is implemented by a response assignment control that is capable of variably assigning convergence characteristics of a controlled variable to a desired value. In this embodiment, the feedback correction part 68 is implemented by a sliding mode controller which is one scheme of the response assignment control.

Alternatively, the feedback correction part 68 may be configured to implement another response assignment control (e.g., a back-stepping control) or may be configured to implement another feedback control such as a PID controller.

The desired gauge pressure PBGA_CMD and the actual gauge pressure PBGA are input into the feedback correction part 68. A switching function determining part 72 calculates an error E between the desired gauge pressure PBGA_CMD and the actual gauge pressure PBGA as expressed in the equation (10).

$$E = PBGA - PBGA\_CMD \qquad (10)$$

Then, a switching function σ that specifies a convergence behavior of the error E is defined as in the equation (11).

$$\sigma(\text{current value}) = E(\text{current value}) + pole \times E(\text{previous value}) \qquad (11)$$

Here, "pole" is a parameter for specifying a convergence speed of the error E. The error E can converge at a desired speed by changing a value of the parameter "pole".

In one embodiment, the parameter pole may be set in accordance with a counter after a start of the feedback. Preferably, pole is set to satisfy $-1 < pole < 0$. For example, the convergence speed of the error E may be gradually increased by making the value of the parameter pole greater with the elapsed time since the feedback control was started.

The calculated switching function value σ is sent to a reaching law determining part 76 and an adaptive law determining part 78.

A gain switching flag determining part 74 determines whether or not a gain switching flag is to be set. The gain switching flag is a flag for decreasing a feedback gain when a predetermined condition is met. In one embodiment, the gain switching flag is set when the engine load is low, when a fuel cut is being performed, when the desired gauge pressure is low, when a variation in the desired gauge pressure is large, or when the engine load is high.

In this regard, the condition of "when a fuel cut is being performed" is determined by monitoring a fuel cut flag that is to be set during the fuel cut operation. The conditions of "when the desired gauge pressure is low" and "when a variation in the desired gauge pressure is large" are determined by the desired gauge pressure and its variation amount. The conditions of "when the engine load is low" and "when the engine load is high" are determined based on the engine rotational speed and the desired intake air amount.

The gain switching flag is sent to the reaching law determining part 76 and the adaptive law determining part 78.

The reaching law determining part 76 refers to a predetermined table to determine a proportional term ΔArch of the feedback control corresponding to the switching function value σ. Two types of the tables are prepared and stored in the memory 10c of the ECU10. One type is used for normal operation and the other type is used when the gain switching flag is set. One of the tables is selected in accordance with whether the gain switching flag has been set. Values of the proportional term ΔArch of the feedback control defined in the table used when the gain switching flag is set are smaller than those defined in the table prepared for the normal operation. Thus, when the engine load is low, when a fuel cut is being performed, when the desired gauge pressure is low, when a variation in the desired gauge pressure is large, or when the engine load is high, a change in the gauge pressure, which may be caused by the feedback control, is reduced to prevent the operating condition from becoming unstable.

Further, the reaching law determining part 76 is preferably configured to determine the proportional term ΔArch when a feedback permission flag is set. More specifically, when the throttle valve is fully opened and hence the gauge pressure is almost zero, when the intake air amount control is prohibited by the variable valve actuation mechanism and hence the lift amount of the intake valve is fixed, or when the engine starts, the feedback permission flag is not set. In these conditions, the reaching law determining part 76 outputs the value of zero.

Alternatively, a feedback gain may be predetermined. The reaching law determining part 76 may calculate the proportional term ΔArch by multiplying the switching function σ value by the predetermined feedback gain. In this case, when the above feedback permission flag is not set, the feedback gain is changed to zero, so that the proportional term ΔArch outputted from the reaching law determining part 76 is zero.

The adaptive law determining part 78 refers to a predetermined table to determine an integral term ΔAadp of the feedback control corresponding to the switching function value σ. Two types of the tables are prepared and stored in the memory 10c of the ECU10. One type is used for normal operation and the other type is used when the gain switching flag is set. One of the tables is selected in accordance with whether the gain switching flag has been set. Values of the integral term ΔAadp of the feedback control defined in the table used when the gain switching flag is set are smaller than those defined in the table prepared for the normal operation. Thus, when the engine load is low, when a fuel cut is being performed, when the desired gauge pressure is low, when a variation in the desired gauge pressure is large, or when the engine load is high, a change in the gauge pressure, which may be caused by the feedback control, is reduced to prevent the operating condition from becoming unstable.

Further, the adaptive law determining part 78 is preferably configured to determine the integral term ΔAadp when the feedback permission flag is set. More specifically, when the throttle valve is fully opened and hence the gauge pressure is almost zero, when the intake air amount control is prohibited by the variable valve actuation mechanism and hence the lift amount of the intake valve is fixed, or when the engine starts, the feedback permission flag is not set. In these conditions, the adaptive law determining part 78 outputs the value of zero.

Alternatively, a feedback gain may be predetermined. The adaptive law determining part 78 may calculate the integral term ΔArch by multiplying the switching function value σ by the predetermined feedback gain. In this case, when the above feedback permission flag is not set, the feedback gain is changed to zero, so that the integral term ΔAadp outputted from the adaptive law determining part 78 is zero.

The proportional term ΔArch from the reaching law determining part 76 and the integral term ΔAadp from the adaptive law determining part 78 are added. A predetermined limit process 80 is performed on the value obtained by the above addition and then the resultant value is outputted as a correction amount ΔA for the throttle opening area.

Referring back to FIG. 2, subsequent processes will be described. An adder 69 adds the throttle opening area A from the opening area correcting part 66 and the correction amount ΔA for the throttle opening area from the feedback correction unit 68. The resultant value is inputted into a throttle opening degree determining part 70.

Figure 7:
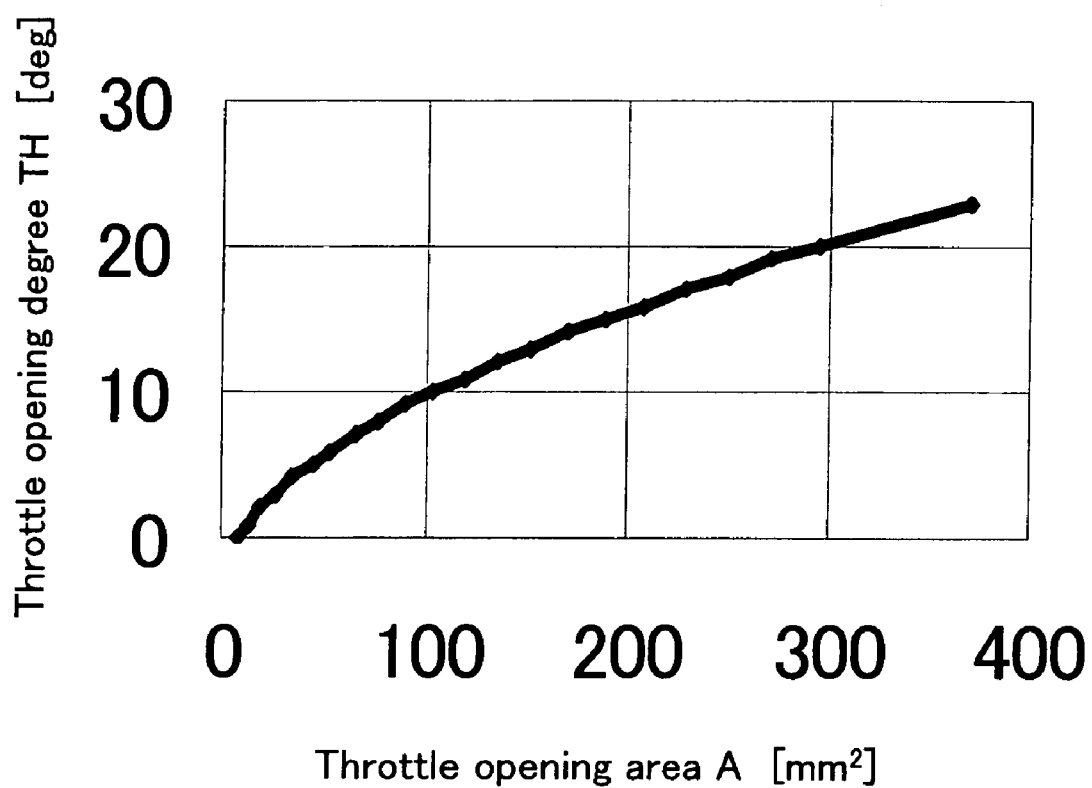
FIG. 7 is a table defining a relation between a throttle opening area and a throttle opening degree in accordance with one embodiment of the present invention.

The throttle opening degree determining part 70 refers to a predetermined table to determine an opening degree TH of the throttle valve corresponding to the throttle opening area A+ΔA. FIG. 7 shows an example of such a table. The table can be created by examining, through simulation in advance, a relation between the throttle opening area and the throttle opening degree. The table may be stored in the memory 10c of the ECU 10.

The intake air controlling apparatus 10 performs the constant negative pressure control by controlling the throttle valve 46 (FIG. 1) in accordance with the throttle opening degree TH thus determined.

According to the present invention, the throttle opening area can be corrected in response to a change in the desired gauge pressure, the intake air temperature and the atmospheric pressure by using the correction equation (4). Therefore, preparing a plurality of tables depending on various operating conditions according to conventional schemes is not required. The throttle opening area can be determined with only one table and only one correction equation. Thus, the number of process steps and the amount of data to be stored in the ECU for implementing the constant negative pressure control can be significantly reduced in comparison with conventional schemes.

Further, even when the secondary air flows into the intake manifold, a more accurate constant negative pressure control can be implemented without being influenced by the secondary air because the throttle opening area is estimated based on the effective intake air amount.

Further, the feedback capability of the constant negative pressure control can be improved under any operating condition because the feedback correction part makes the feedback gain smaller or sets the correction amount to zero under unusual operating conditions such as a condition where the throttle valve is fully opened, where the engine starts, where a fuel cut is being performed and so on.

Next, an intake air controlling apparatus in accordance with a second embodiment of the present invention will be described. In the first embodiment, the throttle opening area A is calculated by the throttle opening area correcting part 66 on the assumption that the flow coefficient is constant as shown in the above equations (5) and (6). However, as seen in a well-known relation shown in FIG. 8 for the standard orifice flow meter defined in standards such as the JIS (Japan Industrial Standards), the flow coefficient C varies depending on a Reynolds number and an opening area ratio.

For example, assume that the flow coefficient C under the reference condition described in the first embodiment (that is, the flow coefficient C in the equation (6)) is represented by Cbase. When the flow coefficient C under the current condition (that is, the flow coefficient C in the equation (5)) is not equal to Cbase, the throttle opening area A determined by the correction equation (4) may include an error as seen from the equations (7) through (9). For example, when C is smaller than Cbase, it is preferable that the throttle opening area A calculated according to the equation (4) be corrected to be a larger value because the current condition indicates that air is more difficult to flow through the throttle valve in comparison with the reference condition. Thus, in this second embodiment, considering variations in the flow coefficient, a scheme for further correcting the throttle opening area A is proposed.

Figure 9:
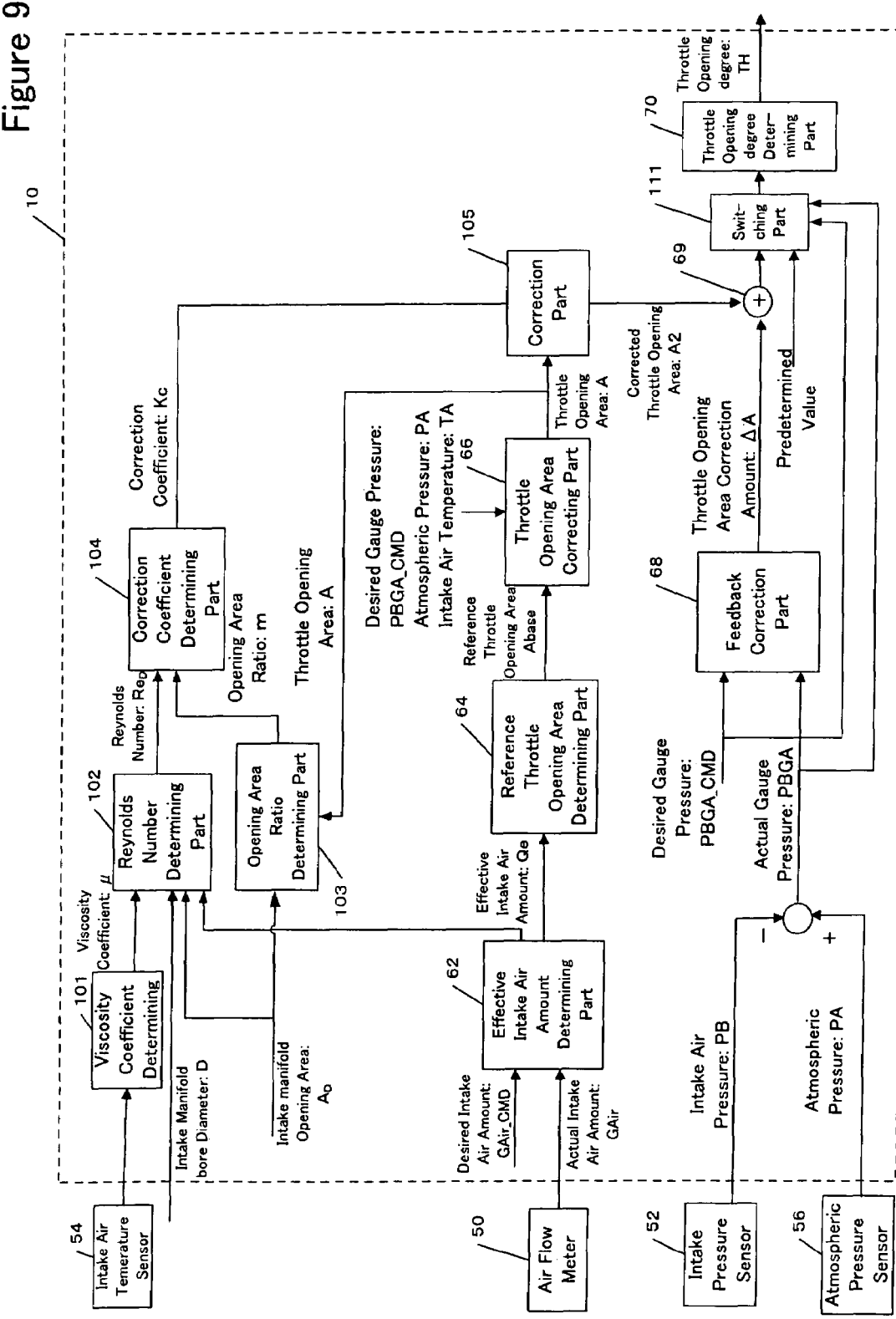
FIG. 9 is a functional block diagram of an intake air controlling apparatus for a constant negative pressure control in accordance with a second embodiment of the present invention.

FIG. 9 is a block diagram of the intake air controlling apparatus in accordance with the second embodiment. The second embodiment is different from the first embodiment in that it includes the means (functional blocks 101 through 105) for further correcting the throttle opening area A calculated by the throttle opening area correcting part 66 as well as a switching part 111. Only the differences from the first embodiment will be described below.

Figure 10:
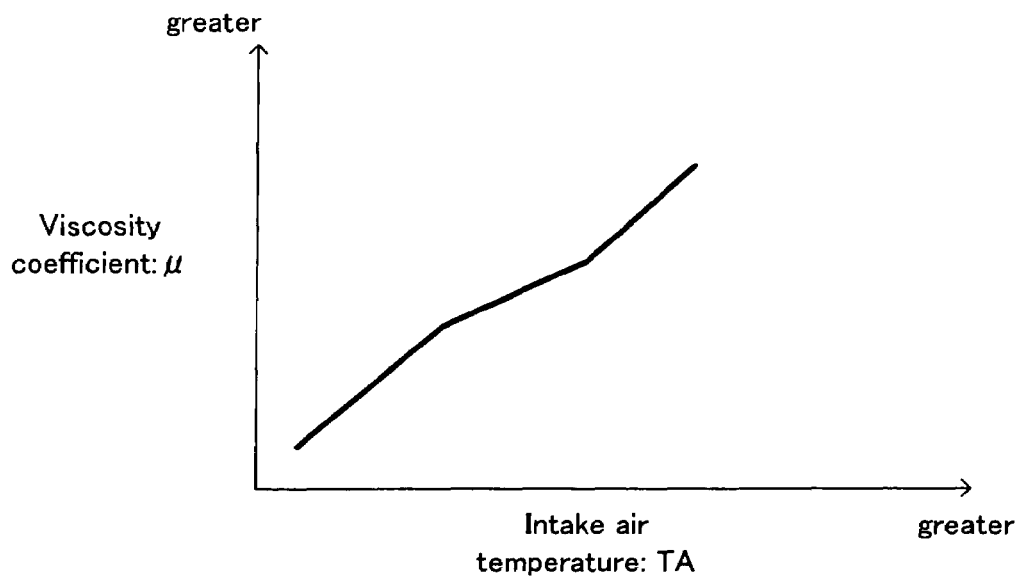
FIG. 10 is a table used for determining a viscosity coefficient in accordance with a second embodiment of the present invention.

A viscosity coefficient determining part 101 determines a viscosity coefficient $\mu$ of the intake air based on the intake air temperature TA detected by the intake air temperature sensor 54 (FIG. 1). More specifically, the viscosity coefficient determining unit 101 refers to a table as shown in FIG. 10 based on the intake air temperature TA to determine the corresponding viscosity coefficient $\mu$. The table may be stored in the memory 10c of the ECU 10. The viscosity coefficient of a gas has the characteristics that vary depending on the temperature. The viscosity coefficient increases with an increase in the temperature.

A Reynolds number determining part unit 102 determines a Reynolds number $Re_D$ of the intake air. As well-known, the Reynolds number is a value obtained by dividing a product of the density, the speed and the length of a fluid by the viscosity coefficient of the fluid. The Reynolds number is an index of the viscosity and the inertia of the fluid. As the Reynolds number is smaller, the flow has a relatively stronger viscosity. As the Reynolds number is larger, the flow has a relatively stronger inertia.

Referring to FIG. 4 again, calculation of the Reynolds number will be described. In the figure, the throttle opening area A has been determined by the opening area correcting part 66 as described in the first embodiment.

As described above, the Reynolds number $Re_D$ of the intake air can be calculated based on the density $\rho$, the speed V and the length of the air flow, and the viscosity coefficient $\mu$. For the fluid flowing in a tube, the "length" is an inner diameter of the tube, that is, the above-described inner diameter D of the intake manifold.

Therefore, the Reynolds number $Re_D$ can be calculated in accordance with the equation (12). Because the intake air amount GAIR represents the amount of air per unit of time, air density $\rho$ (kg/m³)×speed V (m/s) in the equation (12) can be replaced with GAIR (kg/s)/$A_D$ (m²). Accordingly, the Reynolds number $Re_D$ for the effective intake air amount Qe can be calculated based on the effective intake air amount Qe, the opening area $A_D$ and the inner diameter D of the intake manifold, and the viscosity coefficient $\mu$ determined by the viscosity coefficient determining part 101 as shown in the equation (13).

$$Re_D = \frac{\rho \times V \times D}{\mu} \qquad (12)$$

$$= \frac{Qe \times D}{\mu \times A_D} \qquad (13)$$

Alternatively, the Reynolds number Re may be calculated by using the desired intake air amount instead of the effective intake air amount Qe.

An opening area ratio determining part 103 calculates a ratio m of the throttle opening area A relative to the opening area $A_D$ of the intake manifold in accordance with the equation (14).

$$m = A/A_D \qquad (14)$$

Figure 8:
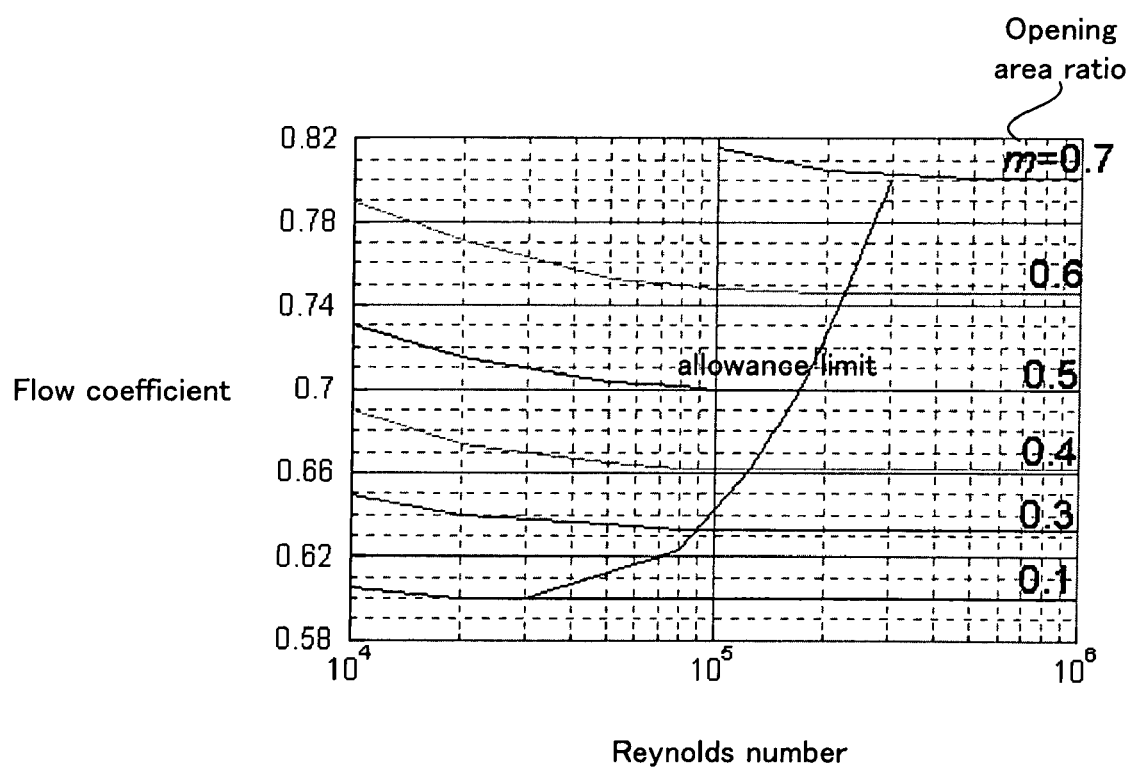
FIG. 8 is a table defining a correlation among a flow coefficient, a Reynolds number and an opening area ratio in the orifice flow meter in the JIS.

Because the flow coefficient has a correlation with the opening area ratio and the Reynolds number as described above, the flow coefficient corresponding to the opening area ratio and the Reynolds number can be determined by referring to, for example, a table as shown in FIG. 8. A correction coefficient Kc for correcting the throttle opening area A calculated in the equation (4) is determined in accordance with the flow coefficient C thus determined. The correction coefficient Kc acts to correct an error of the above determined flow coefficient relative to the flow coefficient Cbase for the reference condition, as described above. Thus, the correction coefficient Kc corresponding to the opening area ratio and the Reynolds number can be predefined in a table, which may be stored in the memory of the ECU 10.

Figure 11:
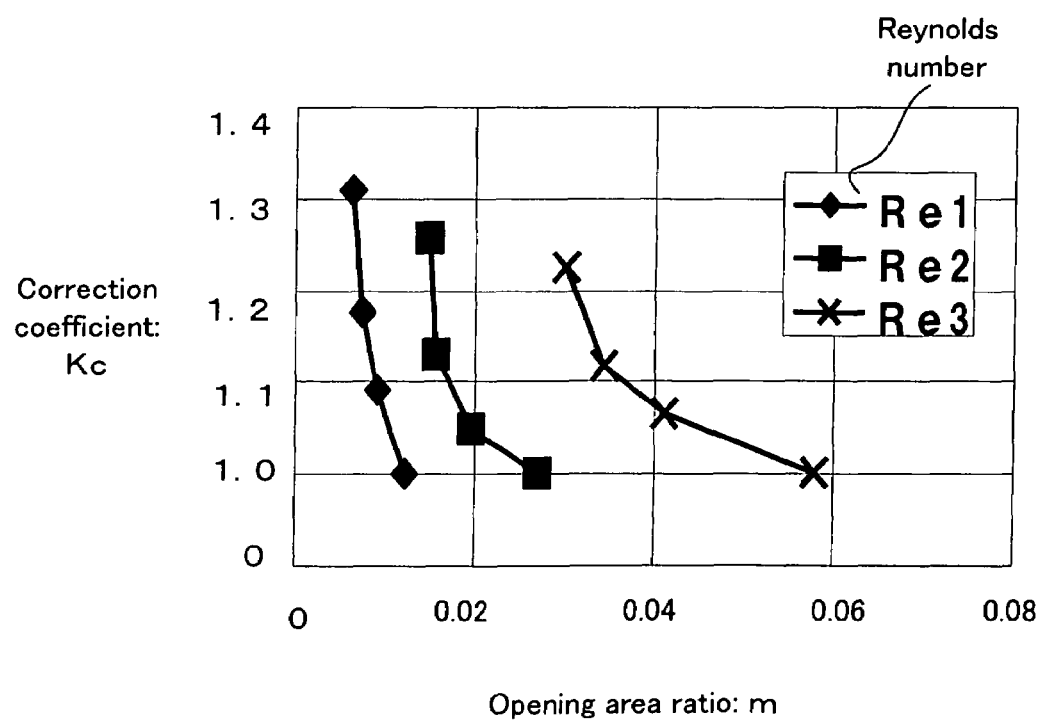
FIG. 11 is a table used for determining a correction coefficient in accordance with a second embodiment of the present invention.

An example of such a table is shown in FIG. 11. The table has been created on the condition of the desired gauge pressure PBGA_CMD (in this example, 100 mmHg (13.33 kPa)) that is used in the equation (4). In the table, a relation between the opening area ratio m and the correction coefficient Kc is shown for different values, Re1, Re2 and Re3 (Re1<Re2<Re3), of the Reynolds number.

In this table, a condition where the correction coefficient Kc is 1 indicates that the flow coefficient C based on the current Reynolds number $Re_D$ and the current opening area ratio m is equal to the flow coefficient Cbase for the reference condition and hence the correction of the throttle opening area A is not made.

As the opening area ratio m is smaller, the correction coefficient Kc is made larger. As the opening area ratio is smaller, the flow coefficient C is smaller and hence the air flow is more difficult to pass through the throttle valve 46. Therefore, the correction coefficient Kc is made larger so as to make the throttle opening area A larger.

Further, under the same opening area ratio m, as the Reynolds number is larger, the correction coefficient Kc is made larger. As the Reynolds number is larger, the flow coefficient C is smaller. Therefore, the correction coefficient Kc is made larger so as to make the throttle opening area A larger.

A correction coefficient determining part 104 refers to a table as shown in FIG. 11 based on the Reynolds number $Re_D$ and the opening area ratio m that have been calculated by the Reynolds number determining part 102 and the opening area ratio determining part 103, respectively, to determine the corresponding correction coefficient Kc.

It should be noted that although the table shown in FIG. 11, which is only one example, defines only three values for the Reynolds number, more Reynolds numbers may be defined. Further, when the Reynolds number calculated by the Reynolds number determining part 102 is between one value and another value, the correction coefficient Kc corresponding to the calculated Reynolds number can be calculated by any known interpolation manner.

Referring back to FIG. 9, a correction part 105 multiplies the throttle opening area A calculated by the opening area correcting part 66 by the correction coefficient Kc thus calculated to calculate a corrected throttle opening area A2. According to this correction process, the throttle opening area A for achieving the desired gauge pressure can be more accurately determined because the correction coefficient Kc is based on the viscosity of the intake air and the throttle opening area ratio m as described above.

In the second embodiment, as shown in FIG. 9, the adder 69 adds the correction amount ΔA calculated by the feedback correction part 68 to the corrected throttle opening area A2 calculated by the correction part 105.

The second embodiment further differs from the first embodiment in that a switching part 111 is provided. The switching part 111 calculates a difference ΔPBGA between the actual gauge pressure PBGA and the desired gauge pressure PBGA_CMD. If an absolute value of the difference ΔPBGA is equal to or smaller than a predetermined threshold value, the switching part 111 provides the throttle opening area A2 to the throttle opening degree determining part 70. The throttle opening degree determining part 70 refers to a table as shown in FIG. 7 to determine a throttle opening degree TH corresponding to the throttle opening area A2.

If the absolute value of the difference ΔPBGA is greater than the predetermined threshold value, the switching part 70 provides a predetermined throttle opening area value (more specifically, an opening area value indicating a full close of the throttle valve) to the throttle opening degree determining part 70 so as to stop the feedback control. The throttle opening degree determining part 70 refers to a table as shown in FIG. 7 to determine a throttle opening degree TH corresponding to the throttle opening area indicating a full close. Thus, variations in the operating condition can be avoided by stopping the feedback control when the difference between the actual gauge pressure and the desired gauge pressure is large.

Alternatively, the switching part 70 may send to the throttle opening degree determining part 70 a signal indicating that the above difference ΔPBGA is greater than the predetermined threshold value, so that the throttle opening degree determining part 70 outputs a predetermined throttle opening degree TH indicating a full close without referring to a table as shown in FIG. 7.

The throttle valve 46 is controlled in accordance with the throttle opening degree TH that is outputted by the throttle opening degree determining part 70.

Figure 12:
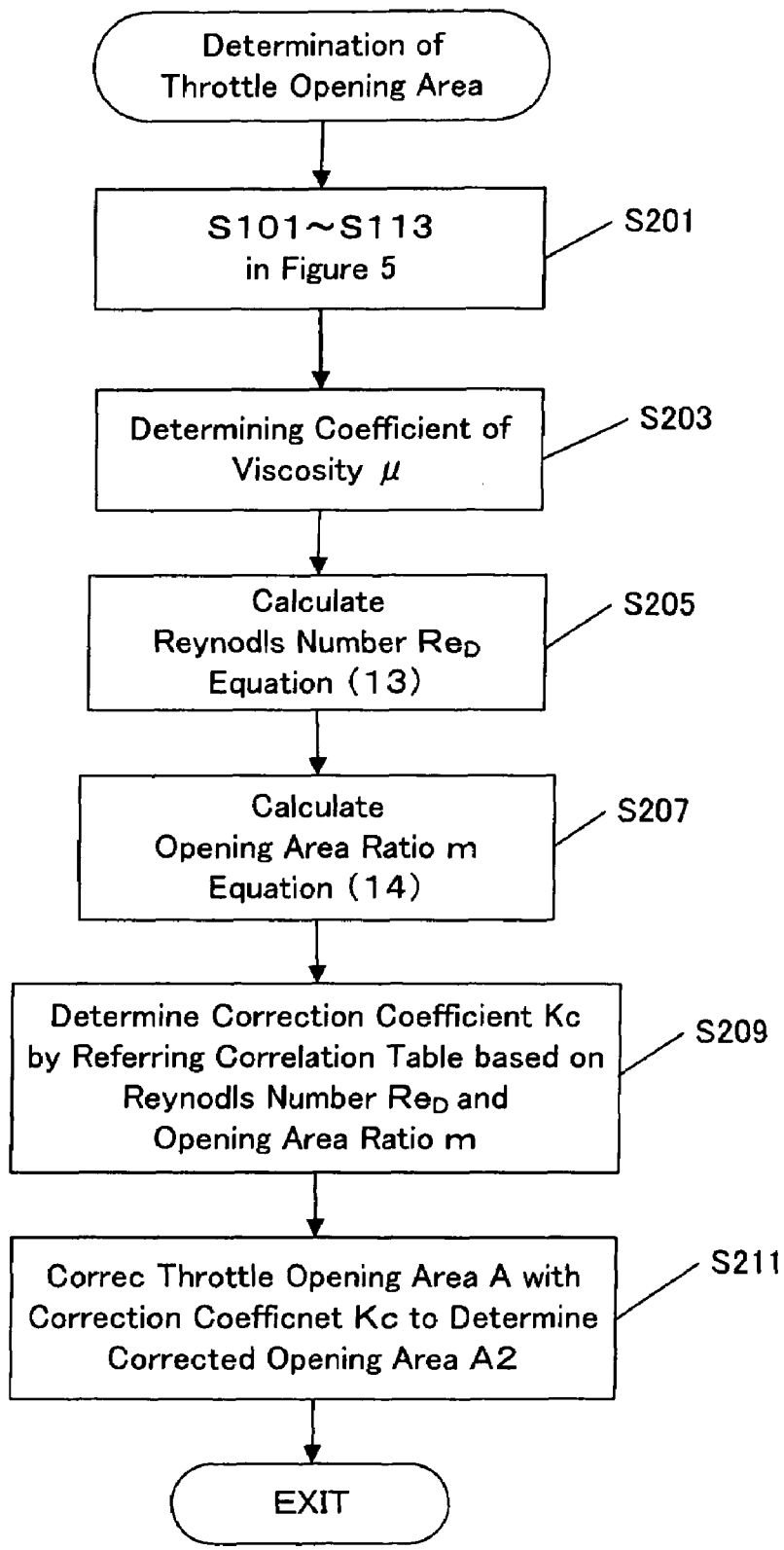
FIG. 12 is a flowchart of a process for determining a throttle opening area in accordance with a second embodiment of the present invention.

FIG. 12 is a flowchart of a process for determining the corrected opening area A2 in accordance with the second embodiment. In one embodiment, the process is carried out by the CPU of the ECU 10, and more specifically carried out by the effective intake air amount determining part 62, the reference throttle opening area determining part 64, the throttle opening area correcting part 66, the viscosity coefficient determining part 101, the Reynolds number determining part 102, the opening area ratio determining part 103, the correction coefficient determining part 104 and the correction part 105. This process may be carried out in a predetermined time interval.

In step S201, steps S101 through S113 of FIG. 5 in accordance with the first embodiment are performed. Description for these steps is omitted here. In step S203, the viscosity coefficient μ is determined by referring to a table as shown in FIG. 10 based on the current intake air temperature TA. In step S205, the Reynolds number $Re_D$ is calculated in accordance with the equation (13) by using the effective intake air amount Qe determined in step S201 and the viscosity coefficient μ determined in step S203. In step S207, the opening area ratio m is calculated in accordance with the equation (14) by using the opening area A calculated in step S201.

In step S209, the correction coefficient Kc is determined by referring to a table as shown in FIG. 11 based on the Reynolds number $Re_D$ and the opening area ratio m calculated in steps S205 and S207. In step S211, the corrected opening area A2 is calculated by multiplying the correction coefficient Kc by the opening area A calculated in step S201.

The feedback control that has been described above in the first embodiment referring to FIG. 6 can be similarly applied to the second embodiment. Description of the feedback control is omitted here.

In one embodiment of the invention, the above described intake air control is implemented in a computer program embodied on a computer readable medium.

Although the present invention has been described for the specific embodiments, the present invention should not be limited to such embodiments, and the present invention can be modified without departing from the scope of the invention.

What is claimed is:

1. An intake air controlling apparatus of an internal combustion engine having a variable valve actuation mechanism for adjusting at least a lift amount of an intake valve to control an intake air amount and a throttle valve for keeping a gauge pressure in an intake manifold at a predetermined desired gauge pressure, the apparatus comprising:
   means for determining a reference throttle opening area by referring to a first table based on a desired intake air amount, the first table defining a relation between an intake air amount and a throttle opening area under a reference gauge pressure, a reference atmospheric pressure and a reference intake air temperature; and
   means for determining a throttle opening area for achieving the desired gauge pressure by correcting the determined reference throttle opening area with a correction parameter that is derived based on the Bernoulli's law using the desired gauge pressure, a current atmospheric pressure and a current intake air temperature.

2. The apparatus of claim 1, further comprising means for determining an effective intake air amount through a filtering process that minimizes an error between the desired intake air amount and an actual intake air amount detected by an intake air amount detecting means,
   wherein the reference throttle opening area is determined by referring to the first table based on the effective intake air amount.

3. The apparatus of claim 1, further comprising means for determining an opening degree of the throttle valve by referring to a second table based on the throttle opening area, the second table defining a relation between the throttle opening area and the opening degree of the throttle valve.

4. The apparatus of claim 1, further comprising feedback-correction means for feedback-correcting the throttle opening area by adding a correction amount to the throttle opening area, the correction amount being determined such that the gauge pressure in the intake manifold converges to the desired gauge pressure.

5. The apparatus of claim 4, wherein the feedback-correction means changes a feedback gain used for determining the correction amount when an engine load is low, when an engine load is high, when a fuel cut is being performed, when the desired gauge pressure is low, or when a variation in the desired gauge pressure is large.

6. The apparatus of claim 4, wherein the feedback-correction means stops the feedback correction by setting the correction amount to zero when the throttle valve is fully opened, when the engine starts, or when the engine operates with a fixed lift amount of the intake valve.

7. The apparatus of claim 1, further comprising means for correcting the throttle opening area based on a parameter indicating a viscosity of the intake air of the engine and an opening area ratio of the throttle opening area relative to an opening area of the intake manifold.

8. The apparatus of claim 7, wherein the feedback correction means determines the correction amount for the corrected throttle opening area and adds the correction amount to the corrected throttle opening area.

9. The apparatus of claim 7, further comprising means for prohibiting the feedback correction to control the throttle opening degree to a predetermined value if a difference between the gauge pressure in the intake manifold and the desired gauge pressure is greater than a predetermined value.

10. The apparatus of claim 7, wherein the parameter is a Reynolds number,
the apparatus further comprising means for determining the Reynolds number based on the effective intake air amount, the opening area of the intake manifold, an inner diameter of the intake manifold, and a viscosity coefficient of the intake air.

11. The apparatus of claim 10, further comprising means for determining the viscosity coefficient based on the current intake air temperature.

12. A method for controlling an intake air of an internal combustion engine having a variable valve actuation mechanism for adjusting at least a lift amount of an intake valve to control an intake air amount and a throttle valve for keeping a gauge pressure in an intake manifold at a predetermined desired gauge pressure, the method comprising:
determining a reference throttle opening area by referring to a first table based on a desired intake air amount, the first table defining a relation between an intake air amount and a throttle opening area under a reference gauge pressure, a reference atmospheric pressure and a reference intake air temperature; and
determining a throttle opening area for achieving the desired gauge pressure by correcting the determined reference throttle opening area with a correction parameter that is derived based on the Bernoulli's law using the desired gauge pressure, a current atmospheric pressure and a current intake air temperature.

13. The method of claim 12, further comprising determining an effective intake air amount through a filtering process that minimizes an error between the desired intake air amount and an actual intake air amount detected by an intake air amount detecting means,
wherein the reference throttle opening area is determined by referring to the first table based on the effective intake air amount.

14. The method of claim 12, further comprising determining an opening degree of the throttle valve by referring to a second table based on the throttle opening area, the second table defining a relation between the throttle opening area and the opening degree of the throttle valve.

15. The method of claim 12, further comprising feedback-correcting the throttle opening area by adding a correction amount to the throttle opening area, the correction amount being determined such that the gauge pressure in the intake manifold converges to the desired gauge pressure.

16. The method of claim 15, further comprising changing a feedback gain used for determining the correction amount when an engine load is low, when an engine load is high, when a fuel cut is being performed, when the desired gauge pressure is low, or when a variation in the desired gauge pressure is large.

17. The method of claim 15, further comprising stopping the feedback correction by setting the correction amount to zero when the throttle valve is fully opened, when the engine starts, or when the engine operates with a fixed lift amount of the intake valve.

18. The method of claim 12, further comprising correcting the throttle opening area based on a parameter indicating a viscosity of the intake air of the engine and an opening area ratio of the throttle opening area relative to an opening area of the intake manifold.

19. The method of claim 18, wherein the feedback correction is made by determining the correction amount for the corrected throttle opening area and adding the correction amount to the corrected throttle opening area.

20. The method of claim 18, further comprising prohibiting the feedback correction to control the throttle opening degree to a predetermined value if a difference between the gauge pressure in the intake manifold and the desired gauge pressure is greater than a predetermined value.

21. The method of claim 18, wherein the parameter is a Reynolds number,
the method further comprising determining the Reynolds number based on the effective intake air amount, the opening area of the intake manifold, an inner diameter of the intake manifold, and a viscosity coefficient of the intake air.

22. The method of claim 21, further comprising determining the viscosity coefficient based on the current intake air temperature.

23. A computer program embodied on a computer readable medium for controlling an intake air of an internal combustion engine having a variable valve actuation mechanism for adjusting at least a lift amount of an intake valve to control an intake air amount and a throttle valve for keeping a gauge pressure in an intake manifold at a predetermined desired gauge pressure, comprising the steps of:
determining a reference throttle opening area by referring to a first table based on a desired intake air amount, the first table defining a relation between an intake air amount and a throttle opening area under a reference gauge pressure, a reference atmospheric pressure and a reference intake air temperature; and
determining a throttle opening area for achieving the desired gauge pressure by correcting the determined reference throttle opening area with a correction parameter that is derived based on the Bernoulli's law using the desired gauge pressure, a current atmospheric pressure and a current intake air temperature.

24. The computer program of claim 23, further comprising determining an effective intake air amount through a filtering process that minimizes an error between the desired intake air amount and an actual intake air amount detected by an intake air amount detecting means, wherein the reference throttle opening area is determined by referring to the first table based on the effective intake air amount.

25. The computer program of claim 23, further comprising determining an opening degree of the throttle valve by referring to a second table based on the throttle opening area, the second table defining a relation between the throttle opening area and the opening degree of the throttle valve.

26. The computer program of claim 23, further comprising feedback-correcting the throttle opening area by adding a correction amount to the throttle opening area, the correction amount being determined such that the gauge pressure in the intake manifold converges to the desired gauge pressure.

27. The computer program of claim 26, further comprising changing a feedback gain used for determining the correction amount when an engine load is low, when an engine load is high, when a fuel cut is being performed, when the desired gauge pressure is low, or when a variation in the desired gauge pressure is large.

28. The computer program of claim 26, further comprising stopping the feedback correction by setting the correction amount to zero when the throttle valve is fully opened, when the engine starts, or when the engine operates with a fixed lift amount of the intake valve.

29. The computer program of claim 23, further comprising correcting the throttle opening area based on a parameter indicating a viscosity of the intake air of the engine and an opening area ratio of the throttle opening area relative to an opening area of the intake manifold.

30. The computer program of claim 29, wherein the feedback correction is made by determining the correction amount for the corrected throttle opening area and adding the correction amount to the corrected throttle opening area.

31. The computer program of claim 29, further comprising prohibiting the feedback correction to control the throttle opening degree to a predetermined value if a difference between the gauge pressure in the intake manifold and the desired gauge pressure is greater than a predetermined value.

32. The computer program of claim 29, wherein the parameter is a Reynolds number, the computer program further comprising determining the Reynolds number based on the effective intake air amount, the opening area of the intake manifold, an inner diameter of the intake manifold, and a viscosity coefficient of the intake air.

33. The computer program of claim 32, further comprising determining the viscosity coefficient based on the current intake air temperature.

* * * * *